(No Model.) 2 Sheets—Sheet 1.
E. WHITTUM.
THREAD GUIDE FOR SPINNING MACHINES AND SUPPORT THEREFOR.
No. 594,581. Patented Nov. 30, 1897.
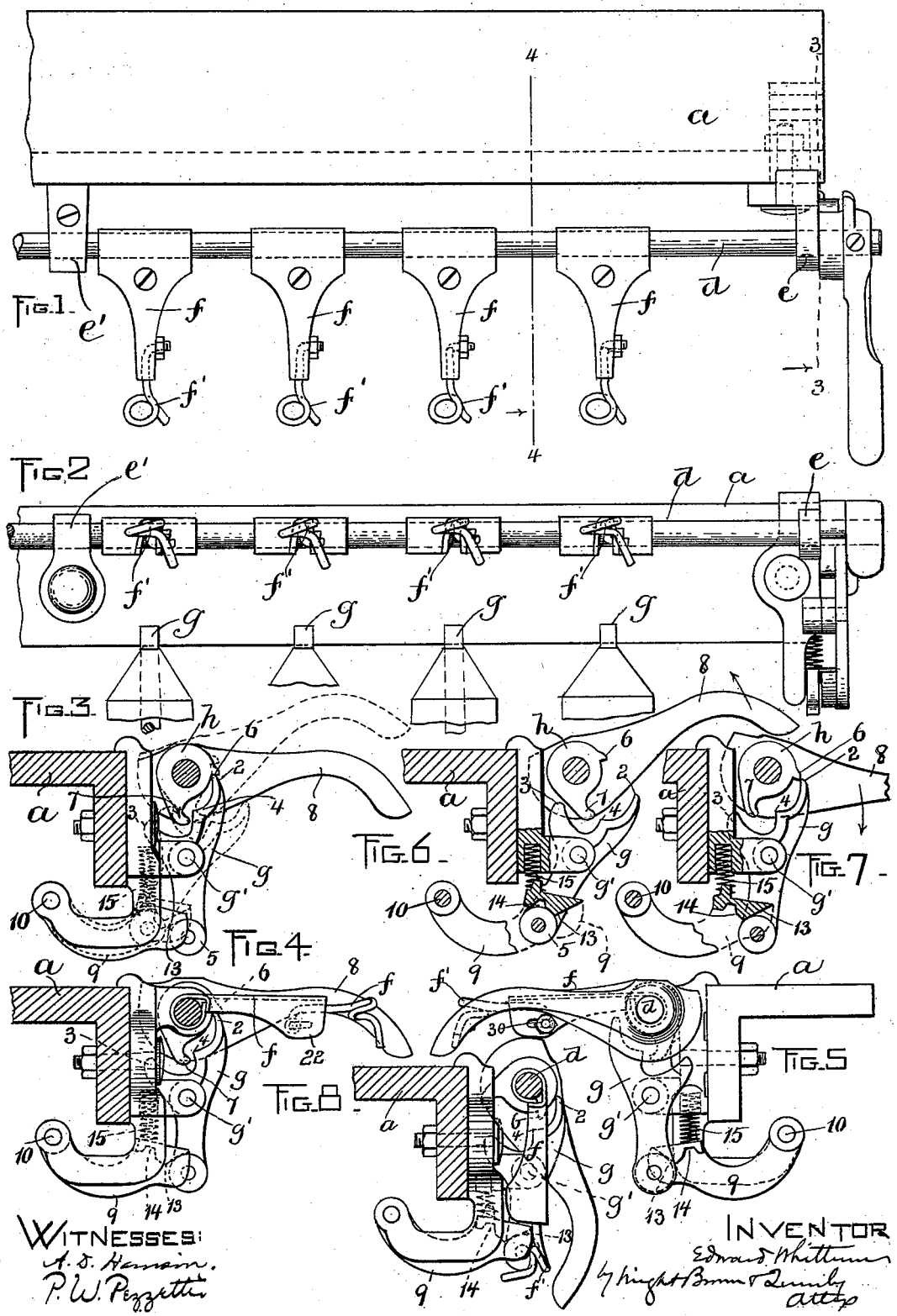
Witnesses:
A. D. Harraon.
P. W. Pezzetti.
Inventor
Edward Whittum
by Knight Bros & Quinby
Attys (No Model.) 2 Sheets—Sheet 2.
E. WHITTUM.
THREAD GUIDE FOR SPINNING MACHINES AND SUPPORT THEREFOR.
No. 594,581. Patented Nov. 30, 1897.
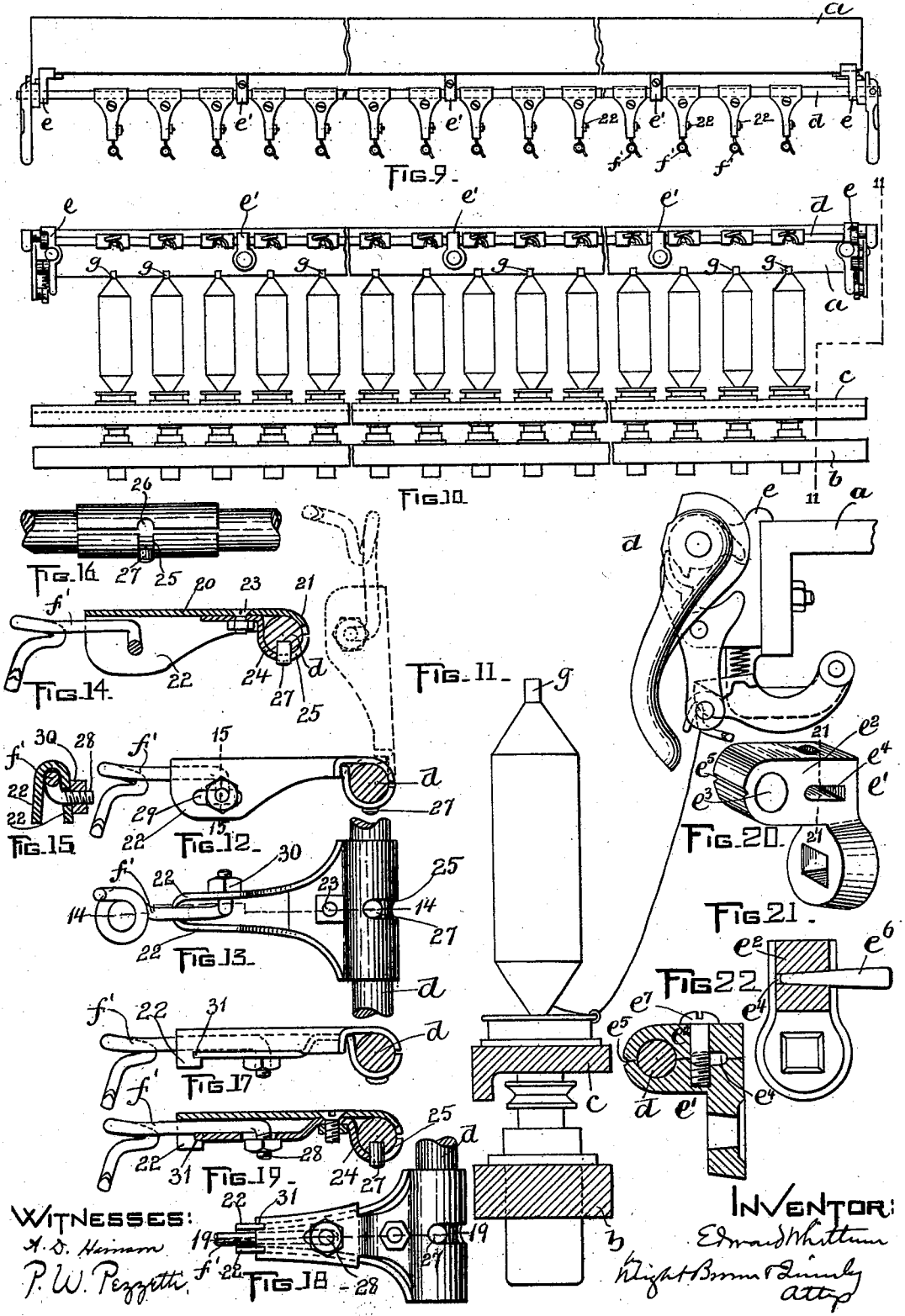
Witnesses:
A. D. Harmon
P. W. Pezzetti
Inventor:
Edward Whittum

UNITED STATES PATENT OFFICE.

EDWARD WHITTUM, OF FALL RIVER, MASSACHUSETTS.

THREAD-GUIDE FOR SPINNING-MACHINES AND SUPPORT THEREFOR.

SPECIFICATION forming part of Letters Patent No. 594,581, dated November 30, 1897.

Application filed February 16, 1897. Serial No. 623,677. (No model.)

*To all whom it may concern:*

Be it known that I, EDWARD WHITTUM, of Fall River, in the county of Bristol and State of Massachusetts, have invented certain new and useful Improvements in Thread-Guides for Spinning-Machines and Supports Therefor, of which the following is a specification.

This invention has for its object to provide means for simultaneously displacing and replacing a series of thread-guides on a spinning-machine from any point along a series of guides and for enabling the operator to release and displace the entire series of guides while standing at one point and to replace and secure the entire series of guides while standing at another point.

The invention also has for its object to provide an improved construction of the thread-guide and its supporting-arm, looking to the simplicity and durability of the same.

The invention consists in the improvements which I will now proceed to describe and claim.

Of the accompanying drawings, forming a part of this specification, Figure 1 represents a top plan view of a portion of the roller-beam of a spinning-machine and a part of the series of thread-guides. Fig. 2 represents a front elevation of the construction shown in Fig. 1. Fig. 3 represents a section on line 3 3 of Fig. 1. Fig. 4 represents a section on line 4 4 of Fig. 1. Fig. 5 represents an end view of the construction shown in Figs. 1 and 2. Figs. 6 and 7 represent sectional views on the plane of line 3 3 of Fig. 1, showing the parts in different positions from Fig. 3. Fig. 8 represents a section on the plane of line 4 4 of Fig. 1, showing the parts in different positions from Fig. 4. Fig. 9 represents a top view, and Fig. 10 a front view, of portions of a spinning-frame equipped with my improvements. Fig. 11 represents a vertical section through Fig. 10, showing the thread-guides depressed. Fig. 12 represents a side view of one of the thread-guides and its supporting-arm. Fig. 13 represents a bottom view of the construction shown in Fig. 12. Fig. 14 represents a section on line 14 14 of Fig. 13. Fig. 15 represents a section on line 15 15 of Fig. 12. Fig. 16 represents a rear view of a portion of the thread-arm-carrying shaft and one of the arms thereon. Fig. 17 represents a side view, and Fig. 18 a bottom view, of a modified construction of the thread-arm. Fig. 19 represents a section on line 19 19 of Fig. 18. Fig. 20 represents a perspective view of one of the intermediate brackets for supporting the thread-eye shaft. Fig. 21 represents a section on line 21 21 of Fig. 20. Fig. 22 represents a section of the bracket, taken at a right angle to Fig. 21.

The same letters and numerals of reference indicate the same parts in all the figures.

In the drawings, *a* represents the roller-beam, *b* the spindle-rail, and *c* the ring-rail, of a spinning-machine, said parts being relatively arranged in the usual or any suitable manner.

*d* represents a rod or shaft which is mounted to turn or oscillate in bearings formed in brackets *e e'*, affixed to the roller-beam. The shaft *d* is provided with a series of arms *f*, to which are affixed the pigtails or thread-eyes *f'*, which project from the shaft *d* and when in operative position occupy the usual relation to the spindles *g*.

The shaft *d* is normally supported by a latch mechanism, hereinafter described, in position to hold the thread-guides horizontally, as shown in Figs. 1, 2, and 4, the guides being thus held in their operative relation to the spindles. The latch mechanism comprises a member affixed to and movable with the shaft *d* and a complemental member which is movable independently of said shaft and is mounted on the supporting-frame. The first-mentioned member, as here shown, is a collar *h*, affixed to the shaft *d*, and provided with shoulders 6 7 and a handle 8. The independently-movable complemental member is a dog *g*, which is pivoted at *g'* to the bracket *e* and is provided at one end with fingers 2 3 and an intermediate shoulder 4, and at the other end with a trundle-roll 5. A biasing device is provided which is operated by movements of the shaft and its latch member, as hereinafter described, to give the dog a bias first away from and then toward the collar *h*, said device comprising an arm 9, pivoted at 10 to the bracket and having a shoulder provided with two oppositely-inclined faces 13 and 14, said arm 9 being pressed downwardly by a spring 15. When the latch is supporting the shaft in its operative position, the dog-finger 2 engages and supports the collar-shoulder 6, as shown in Figs. 3 and 4, the finger 7 being beside and close to the shoulder 4. At the same time the inclined face 13 of the arm 9 bears on the trundle-roll 5, and the pressure of the spring acting through said inclined face holds the finger 2 of the dog yieldingly pressed against the collar $h$. Now if the handle 8 be slightly raised, as shown by dotted lines in Fig. 3 and by full lines in Fig. 6, the finger 7, pressing against the shoulder 4, swings the upper end of the dog outwardly from the collar, its lower end swinging inwardly and carrying the trundle-roll 5 from the inclined face 13 to the inclined face 14, the spring 15 being thus caused to exert pressure on the opposite side of the trundle-roll and hold the dog away from the collar $h$, as shown in Fig. 6. The collar and shaft are thus released and permitted to turn in the direction required to swing the thread-guides downwardly to a vertical position behind the spindles, as shown in Fig. 8, thus preparing for the operation of doffing. This movement of the collar and shaft causes the finger 7 of the collar to act on the finger 3 of the dog and swing the dog back toward its former position, thus moving the trundle-roll 5 back into contact with the face 13 of the arm 9 and causing the spring 15 to press the dog-finger 2 against the collar. When the spring commences to act in this direction, the collar-shoulder 6 is below the point of the finger 2, as shown in Figs. 7 and 8, so that the finger cannot arrest the shoulder until the operator elevates the handle 8 to the position shown in Fig. 3, thus raising the shoulder 6 above the finger 2, whereupon said finger springs under the shoulder 6 and again locks the shaft, with the thread-guides in their operative position.

From the foregoing it will be seen that a partial rotation of the shaft in one direction makes the latch mechanism inoperative and permits the downward movement of the thread-guides, the partial rotation of the shaft attending this movement making the latch mechanism again operative or setting it for operation, so that the shaft is latched when the thread-guides are restored to their operative position. The shaft therefore constitutes a means through which the operator can operate the latch mechanism. The operator is thus enabled to unlatch the shaft and displace the thread-guides and to replace the thread-guides and latch the shaft while standing at any point along the length of the shaft. He can therefore unlatch the shaft and displace the thread-guides while standing at one end of the shaft, and then, commencing to doff at that end, he can proceed along the series of spindles until he reaches the other end and can then while standing at that end replace the entire series of thread-guides and latch the shaft without walking back to the point of beginning. Much time is therefore saved in the operation of doffing as compared with machines in which the latch mechanism is operated independently of the shaft, so that the operator has to stand at the point where the latch mechanism is located when unlatching the shaft and has to return to said point after the doffing operation to relatch the shaft.

I do not limit myself to the particular shaft-operated latching mechanism here shown and may provide any other suitable mechanism adapted to be made inoperative and operative by movements of the shaft. A plurality of the described latch mechanisms may be employed, as shown in Figs. 9 and 10, where I show one at each end of the shaft, or one of said mechanisms may serve for the entire shaft. The shaft may be turned to operate the latch mechanism or mechanisms by means other than the handle 8. For example, either of the thread-guide arms $f$ may serve as a substitute for said handle, so that the operator may turn the shaft to latch and unlatch it while standing at any point between the ends of the shaft.

My improvements relate in part to the construction of the arms $f$ and the guides or pigtails $f'$. Each arm $f$ comprises a sheet-metal section 20, having its rear portion 21 curved to partly embrace the shaft $d$ and having ears 22 formed on its front end, said ears being separated by a recess which receives the shank portion of the pigtail or wire section $f'$. To the section 20 is affixed, by a bolt 23, a clamping member 24, which partially embraces the shaft $d$ and coöperates with the portion 21 in engaging said shaft. Slots 25 26, formed in the parts 21 and 24, receive a stud 27, affixed to the shaft, said slots and stud permitting a limited independent swinging movement of each arm upon the shaft. The wire section $f'$ has its shank portion interposed between the ears 22, the inner end 28 of said shank being bent and screw-threaded and projecting through a slot 29 in one of the ears 22 and is provided with a clamping-nut 30. By this construction the wire section $f'$ is secured to the sheet-metal section without the use of an independent bolt, the end 28, which is integral with the wire section, constituting an effective substitute for a bolt.

In Figs. 17, 18, and 19 I show a modification in which the clamping member 24 is extended forward under the ears 22, the latter being narrower than those shown in Figs. 12 and 15, the forward end of said extension being engaged with the notches 31, formed in the ears 22. In this case the bent end 28 of the wire section extends downwardly and passes through a slot in the extension of the clamping member 24.

The brackets $e'$, which support the shaft $d$ at points between the end brackets $e\ e$, are preferably of sectional construction, so that they can be applied and removed when the shaft is in place and supported by the end brackets. To provide a cheap and simple construction of the intermediate brackets $e'$, I make each as a casting of the form shown in Figs. 20, 21, and 22, the arm or portion $e^2$, having the bearing $e^3$ for the shaft, being provided with a slot $e^4$ between said bearing and the back of the bracket and with a weakening-groove $e^5$ in its front end. The object of the said slot and groove is to enable the arm or portion $e^2$ to be split or converted into separable sections by the insertion of a wedge $e^6$ into the slot $e^4$, the upper and lower parts of the arm $e^2$ being thus broken apart and converted into two separable sections, which are afterward connected by a screw or bolt $e^7$.

I claim—

1. In a spinning-machine, the combination of a series of thread-guides, a rod or shaft on which the said thread-guides are mounted, and a latch mechanism controlled by said shaft.

2. In a spinning-machine, the combination of a series of thread-guides, a rod or shaft on which said thread-guides are mounted, and a latch mechanism comprising a member affixed to and movable with the shaft, and an independently-movable complemental member or dog.

3. In a spinning-machine, the combination of a series of thread-guides, a rod or shaft supporting the same, a latch mechanism comprising a member affixed to and movable with the shaft, an independently-movable complemental member or dog, and a dog-biasing device operated by movements of the shaft.

4. In a spinning-machine, the combination of a series of thread-guides, a rod or shaft supporting the same, shoulders affixed to said shaft, a dog independently mounted and formed to coöperate as described with said shoulders, and a spring-pressed arm having dog-controlling faces adapted to impart biasing pressure to said dog in different directions.

5. A thread-guiding arm comprising a body-section having at one end a socket to engage a supporting rod or shaft, and at the other end a recess, and a wire section bent at its outer end to form an eye and bent and threaded at its other end to form a bolt which passes through one of the walls of the recess and is provided with a clamping-nut.

6. A thread-guiding arm comprising a body-section made from a sheet-metal blank, one end of which is bent to partly embrace a supporting-shaft, while the other end is bent to form ears extending substantially at right angles with said shaft, a clamping member secured to said body-section, and a wire section secured between said ears.

7. A thread-guide comprising an arm or body section provided with an orifice, and a wire pigtail having its inner end bent and threaded and passed through said orifice in the arm, said end having a securing-nut.

8. A thread-guiding arm having a socket formed to embrace a supporting rod or shaft, said socket comprising the two separate curved portions 21 and 24 bolted together and being provided with a slot formed partly in each of said curved portions to receive a stop-stud on said rod, the said stud and slot permitting a limited oscillating movement of the arm on the rod.

In testimony whereof I have signed my name to this specification, in the presence of two subscribing witnesses, this 27th day of January, A. D. 1897.

EDWARD WHITTUM.

Witnesses:
 C. F. BROWN,
 A. D. HARRISON.